United States Patent
Piehler et al.

(10) Patent No.: US 9,042,022 B2
(45) Date of Patent: May 26, 2015

(54) DISPLAY ARRANGEMENT FOR A MOTOR VEHICLE, WITH AN IMAGER AND AN IMAGE SPLITTER

(71) Applicant: Sypro Optics GmbH, Jena (DE)

(72) Inventors: Eberhard Piehler, Lehesten OT Nerkewitz (DE); Gunther Benedix, Jena (DE)

(73) Assignee: Sypro Optics GmbH, Jena (DE)

( * ) Notice: Subject to any disclaimer, the term of this patent is extended or adjusted under 35 U.S.C. 154(b) by 0 days.

(21) Appl. No.: 14/084,796

(22) Filed: Nov. 20, 2013

(65) Prior Publication Data

US 2014/0139928 A1  May 22, 2014

(30) Foreign Application Priority Data

Nov. 22, 2012  (DE) .................. 10 2012 221 310

(51) Int. Cl.
  *G02B 27/14*  (2006.01)
  *G03B 21/14*  (2006.01)
  *G03B 21/28*  (2006.01)
  *G02B 27/01*  (2006.01)

(52) U.S. Cl.
  CPC ............ *G03B 21/14* (2013.01); *G02B 27/0101* (2013.01); *G02B 2027/0118* (2013.01); *G03B 21/28* (2013.01)

(58) Field of Classification Search
  USPC .................................................. 359/630–639
  See application file for complete search history.

(56) References Cited

U.S. PATENT DOCUMENTS

| 6,181,301 | B1 | 1/2001 | Inoguchi et al. |
| 6,674,493 | B2 | 1/2004 | Shaw |
| 7,131,728 | B2 | 11/2006 | Nambudiri et al. |
| 7,144,113 | B2 | 12/2006 | Fujikawa et al. |
| 8,029,145 | B2 * | 10/2011 | Sandberg ........................ 353/78 |
| 8,142,030 | B2 | 3/2012 | Bowden et al. |
| 8,794,768 | B2 * | 8/2014 | Ozawa ............................ 353/85 |
| 8,794,770 | B2 * | 8/2014 | Sieler et al. .................... 353/102 |
| 2011/0175798 | A1 * | 7/2011 | Sato et al. ........................ 345/7 |

FOREIGN PATENT DOCUMENTS

| DE | 197 32 156 | 1/1998 |
| DE | 102004 40 538 | 3/2005 |
| DE | 602 11 219 | 9/2006 |
| DE | 10 2009 02 328 | 11/2009 |

* cited by examiner

*Primary Examiner* — Mohammed Hasan
(74) *Attorney, Agent, or Firm* — Volpe and Koenig, P.C.

(57) ABSTRACT

The invention relates to a display arrangement (1) for a motor vehicle, for displaying information for an occupant (12) of the motor vehicle. To be able to display the information as cost-effectively as possible in two display areas (4, 5) of the motor vehicle, the invention provides that the display arrangement (1) has an image splitter (9) for separating at least two juxtaposed image sections (B1, B2) of the image.

18 Claims, 1 Drawing Sheet

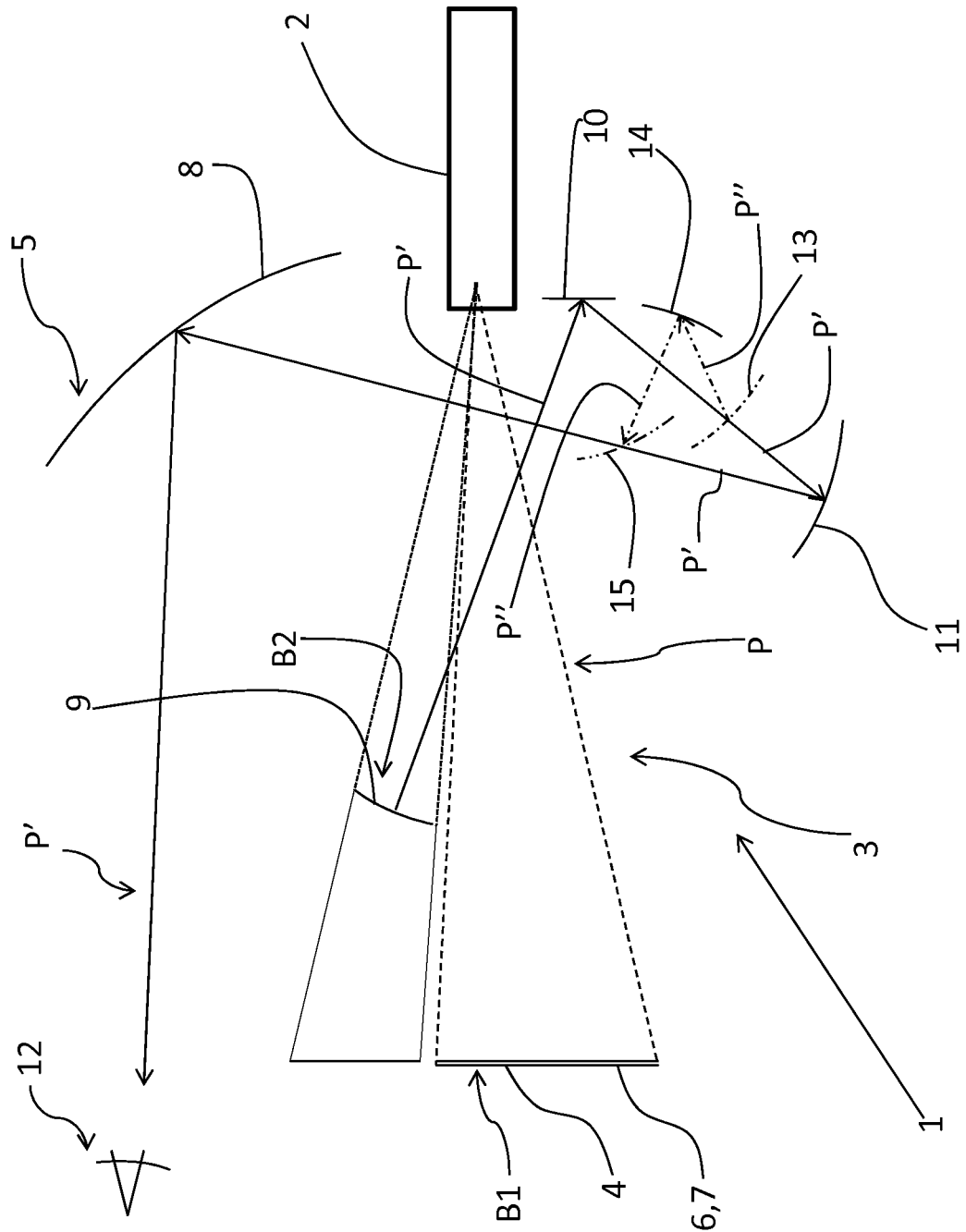

DISPLAY ARRANGEMENT FOR A MOTOR VEHICLE, WITH AN IMAGER AND AN IMAGE SPLITTER

CROSS-REFERENCE TO RELATED PATENT APPLICATIONS

This application claims priority to Germany Priority Application 102012221310.4, filed Nov. 22, 2012 including the specification, drawings, claims and abstract, is incorporated herein by reference in its entirety.

BACKGROUND

The invention relates to a display arrangement for a motor vehicle for displaying information to an occupant of the motor vehicle, with an imager for converting an image signal into a picture containing the information, and a projection apparatus for projecting the image in at least two display areas.

SUMMARY

Display arrangements for motor vehicles are known in the art and are used, for example, for displaying to the vehicle occupant information or image content, such as speed information or navigation information. The image generated by the imager is projected, for example, to areas on which the eyes of the occupant are focused. Frequently, so-called dot matrix devices or digital micro-mirror devices, such as LCD screens or micro-mirror arrangements are used as imagers.

In particular, the imager is a particularly expensive component of the display arrangement, so that additional displays with such a display arrangement are usually not installed due to their high costs.

It is therefore an object of the invention to provide a display arrangement with sufficiently low manufacturing costs so that information can be presented to the occupant on multiple displays.

This object is attained for the aforementioned display arrangement by providing the projection apparatus with an image splitter for separating of at least two juxtaposed image sections of the image, wherein the projection apparatus is configured to project a first of the image sections onto a first of the display areas and a second of the image sections onto a second of the display areas.

Preferably, the first display area has a spatial separation from the second display area.

Since the image sections are arranged side-by-side, images having different content or information can be presented to the vehicle occupant. For example, the speed of the motor vehicle may be displayed in the first display area, and a navigation message may be displayed in the second display area. The driver of the motor vehicle can also be presented in the first display area with information useful for driving the motor vehicle, whereas information not necessary for driving the motor vehicle is presented to a passenger of the motor vehicle in the second display area. The content or information displayed in both display areas can are produced by a single imager, thus obviating the need for a second imager.

The image sections may be viewable by an occupant of the vehicle in different viewing directions and/or at different distances. For example, one of the image sections may be displayed as a real image on the dashboard and the other image section may be displayed as a virtual image in front of the motor vehicle. In particular, different or identical information can be displayed for faster comprehension due to the different arrangement of the image sections, because required accommodation times can be shorter.

The solution of the invention can be further improved by various embodiments having advantages separately or in combination. These embodiments and the associated advantages will be described in the following, wherein the structural measures and their effects are described only by way of example.

According to a first advantageous embodiment, the image splitter may be arranged in a projection path of the image generated by the imager. The projection path may here abut the imager and extend from the imager to the image splitter. By arranging the image splitter in the projection path, image sections arranged side-by-side can be separated from each other easily and in a small space.

The image sections arranged side-by-side may be formed contiguously in order to readily project the information in the display areas. The imager may here laterally protrude into the projection path and may extend into the projection path, for example across a quarter, a third, a half, two thirds or three quarters of the width of the projection path.

According to another advantageous embodiment, the image splitter may be constructed as a concave reflector, in particular a concave mirror. This allows the image sections that were separated by the image splitter from the image to be projected into different focusing planes. The concave reflector may be implemented, for example, with a variable focal length.

According to another advantageous embodiment, the display arrangement may have a display screen on which the first display area is located. The display screen may be formed as a translucent ground glass screen, onto which the first image section may be projected against a viewing direction of the motor vehicle occupant.

According to another advantageous embodiment, the display arrangement may be configured to project the second image section onto a field-of-view display. The second display region may thus be arranged on the field-of-view display. Here, the field-of-view display may be formed as a transparent plate that reflects the image section toward the occupant, wherein the plate is part of the display arrangement. Alternatively, the field-of-view display may be formed separate from the display arrangement, for example, as part of a windshield of the motor vehicle. The field-of-view display is frequently referred to as head-up display.

The second image section projected with the field-of-view display may be formed, for example, as a virtual image. The first image section projected onto the display screen may be a real image.

According to another advantageous embodiment, the projection apparatus may be formed with an image duplexer disposed in a projection path of the second image section. The image duplexer may at least partially or completely double the second image section, for example, to project the second image section into a respective eye of the vehicle driver. By doubling the second image section, the second image section can be directed to the viewer's eyes, in particular the eyes of the motor vehicle occupant, by two light beams having a relatively small luminous flux so that the second image section appears brighter than if the second image section were distributed across the entire field-of-view of the viewer.

The image duplexer is preferably arranged in the projection path of the second image section following the image splitter. The first image section can then be projected independent from the second image section and the image duplexer can at least partially double the second image section independent of the projection of the first image section.

In order to direct the doubled second image sections to a respective eye of the vehicle occupant viewing the second image section, the image duplexer may be configured to project the second image section onto the second display area via two projection paths aligned in different directions and/or at least partially spaced apart from each other, i.e. not completely overlapping. The orientation of the two projection paths of the doubled second image section may be changeable so as to project the second image section into the eyes even when the vehicle occupant assumes different head positions.

For at least changing the brightness of one of the display areas independent of the brightness of the other display area, the display arrangement may include at least one brightness adjuster through which one of the projection paths of the first and second image section at least partially extends. For example, it may be sufficient for good visibility of at least one of the image sections to display the information with low brightness on the image display screen and with high brightness on the field-of-view display. To adjust the brightness of the two display areas even more independently, the display arrangement may include for each of the projection paths of the first and second image section a corresponding brightness adjuster which allows the brightness of the two projected image sections to be adjusted separately. The imager can then be illuminated substantially independent of the brightness of the projected image sections.

A light source illuminating the imager, for example a discharge lamp, at least one LED or at least one laser diode, is used to project the image signal converted by the imager into the image containing the information. The imager may reflect the light emitted by the light source. Alternatively, the produced light may pass through the imager.

The image produced by the imager can be imaged by the projection apparatus as an optical signal representing the image signal. The imager can therefore also be described as an image source, wherein the image presented to the occupant may be an image of the imager and/or the image source.

The invention will now be described with reference to an exemplary embodiment and with reference to the drawings. The different features of the embodiment may be combined independently from one another, as it was already described in the individual advantageous embodiments.

BRIEF DESCRIPTION OF THE DRAWINGS

FIG. 1 shows a schematic diagram of an exemplary embodiment of a display arrangement according to the present invention.

FIG. 1 shows the display arrangement 1 with an imager 2 and a projection apparatus 3. The image generated by the imager 2 and representing the image signal is projected along a projection path P which extends at least partially away from the imager 2.

DETAILED DESCRIPTION

A first portion or section B1 of the image is projected onto a first display area 4 when the display arrangement 1 is operating. A second portion or section B2 of the image is projected onto a different, second display area 5, which is spaced apart from the first display area 4. The first display area 4 is arranged, for example, on a ground glass screen 6 of a display screen 7. The display screen 7 may, for example, be a display screen 7 arranged in a dashboard or a center console of a motor vehicle or protruding from the center console.

The second display area 5 is illustrated as being arranged on a field-of-view display 8, wherein the field-of-view display 8 may be a so-called head-up display formed, for example, by a part of a windshield of the motor vehicle or arranged on the windshield or between the windshield and the viewer.

To separate the image parts or image sections B1, B2 from each other, the display arrangement includes an image splitter 9, which is at least partially arranged in the projection path P of the image. For example, the image splitter 9 protrudes laterally into the projection path P.

The image splitter 9 is preferably constructed as a concave mirror. According to the illustrated embodiment, the image splitter 9 reflects the second image section B2 out of the projection path P of the image into a projection path P' for the second image section B2. The second projection path P' is shown by arrows and is folded, allowing the display arrangement 1 to be constructed with the smallest possible volume.

The image section B1 projected past the image splitter 9 along the projection path P is shown as being projected onto the first display area 4. The second image section B2 incident on the image splitter 9 is shown as being projected onto the second display area 5. The first image section B1 does not overlap the second image section B2. The first and second image sections B1, B2 are portions of the image representing the information, wherein these portions are arranged in the image next to each other and are hence not superimposed. The image sections B1, B2 may be adjoining parts of the image or may be spaced-apart parts of the image.

A reflector 10, for example a mirror, for beam shaping and/or deflecting or folding the second projection path P' is arranged along the second projection path P' following the image splitter 9. A concave reflector 11, for example another concave mirror, follows the reflector 10 along the projection path P'. With the concave reflector 11, the second image section B2 may be displayed in different focusing planes and may be realized for this purpose with a variable focal length.

The field-of-view display 8 is shown along the second projection path P' following the concave reflector 11. The second projection path P' extends from the field-of-view display 8 to a viewer 12, for example the occupant of the motor vehicle. The second image section B2 may be virtually displayed to the viewer 12 behind the field-of-view display 8.

An image duplexer 13 is shown between the mirror 10 and the concave reflector 11. The image duplexer 13 is constructed, for example, as a beam splitter or as a semi-transparent mirror. The image duplexer 13 divides the second image section B2 into two at least partly identical image sections which are projected via the second projection path P' and a third projection path P'". A concave reflector 14, which substantially corresponds in function and/or structure to the concave reflector 11, is arranged following the image duplexer 13 along the third projection path P'" indicated by dot-dash arrows.

A reflecting element 15, for example a mirror, is arranged following the concave reflector 14 along the third projection path P'" so as to fold the third projection path P'" and direct the part of the second image section B2 removed by image duplexer 13 onto the field-of-view display 8.

For aligning at least the second projection path P', the reflective element 10 can be constructed for pivoting about at least one axis. At least one part of the second image section B2, in particular both parts of the second image section B2, can thus be optimally aligned for different viewers 12 or adapted to different head positions the viewer 12. The second and third projection path P', P'" may have different orientations so that the second projection path P' is directed onto one eye of the viewer 12 and the third projection path P'" is directed onto the other eye of the viewer 12.

The projection apparatus 3 for projecting the image generated by the imager 2 based on an image signal may be configured with additional optical components, such as lenses or lens arrays, and reflective elements or elements influencing the polarization of the light used for projection, which however are not shown in FIG. 1 for sake of simplicity.

LIST OF REFERENCE SYMBOLS

1 Display arrangement
2 Imager
3 Projection apparatus
4 First display area
5 Second display area
6 Ground glass screen
7 Display screen
8 Field-of-view display, head-up display
9 Image splitter
10 Mirror
11 Reflector
12 Viewer
13 Image duplexer
14 Reflector
15 Reflective element
P, P', P" Projection path
B1, B2 First and second image section/section

What is claimed is:

1. A display arrangement for displaying information for an occupant of a motor vehicle, comprising:
    an imager configured to convert an image signal into an image containing the information,
    a projection apparatus that comprises an image splitter wherein the image splitter is configured to separate the image into at least a first image section and a second image sections that are next to each other, and wherein the projection apparatus is configured to project the first image section onto a first display area and the second image section onto a second display area; and
    a first brightness adjuster and a second brightness adjuster.

2. The display arrangement according to claim 1, wherein the image splitter is disposed in a projection path of the image generated by the imager.

3. The display arrangement according to claim 2, wherein the image splitter protrudes laterally into the projection path.

4. The display arrangement according to claim 1, wherein the image splitter comprises a concave reflector.

5. The display arrangement according to claim 1, further comprising a display screen on which the first display area is arranged.

6. The display arrangement according to claim 5, wherein the display screen is disposed in a dashboard or a center console of the motor vehicle.

7. The display arrangement according to claim 5, wherein the display screen protrudes from a center console of the motor vehicle.

8. The display arrangement according to claim 1, wherein the second display area is arranged on a field-of-view display.

9. The display arrangement according to claim 8, wherein the field-of-view display is transparent and the second image section is displayed as a virtual image.

10. The display arrangement according to claim 1, further comprising an image duplexer disposed in a projection path of the second image section.

11. The display arrangement according to claim 10, wherein the image duplexer is disposed after the image splitter along the projection path of the second image section.

12. The display arrangement according to claim 10, wherein the image duplexer is configured to project the second image section onto the second display area via two projection paths oriented in different directions.

13. The display arrangement according to claim 10, wherein the image duplexer is configured to project the second image section onto the second display area via two projection paths that are at least partly spaced from each other.

14. The display arrangement according to claim 10, wherein the image duplexer comprises a beam splitter or a semitransparent mirror.

15. The display arrangement according to claim 1, wherein one of the projection paths of the first or the second image sections extends through one of the first brightness adjuster and the second brightness adjuster.

16. The display arrangement according to claim 1, wherein the first display area and the second display area are spaced apart from each other.

17. The display arrangement according to claim 1, wherein the image splitter comprises a concave reflector and wherein the first image section and the second image section are projected onto different focusing planes of the concave reflector.

18. The display arrangement according to claim 1, wherein a first projection path of the first image section extends through the first brightness adjuster, the first brightness adjuster being configured to adjust brightness of the first display area, and wherein a second projection path of the second image section extends through the second brightness adjuster, the second brightness adjuster being configured to adjust brightness of the second display area.

\* \* \* \* \*